(12) United States Patent
Narsude et al.

(10) Patent No.: US 11,750,463 B2
(45) Date of Patent: *Sep. 5, 2023

(54) AUTOMATICALLY DETERMINING AN OPTIMAL AMOUNT OF TIME FOR ANALYZING A DISTRIBUTED NETWORK ENVIRONMENT

(71) Applicant: Cisco Technology, Inc., San Jose, CA (US)

(72) Inventors: Chetan Narsude, Sunnyvale, CA (US); Gaurav Gupta, Santa Clara, CA (US); Shadab Nazar, Fremont, CA (US); Pavan Mamillapalli, San Ramon, CA (US); Sundar Iyer, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/394,285

(22) Filed: Aug. 4, 2021

(65) Prior Publication Data

US 2021/0377123 A1 Dec. 2, 2021

Related U.S. Application Data

(63) Continuation of application No. 16/704,874, filed on Dec. 5, 2019, now Pat. No. 11,121,927, which is a
(Continued)

(51) Int. Cl.
*H04L 41/0896* (2022.01)
*H04L 43/103* (2022.01)
(Continued)

(52) U.S. Cl.
CPC ...... *H04L 41/0896* (2013.01); *G06F 11/3466* (2013.01); *H04L 41/0853* (2013.01);
(Continued)

(58) Field of Classification Search
CPC ... H04L 41/0896; H04L 41/147; H04L 41/12; H04L 41/0853; H04L 41/145;
(Continued)

(56) References Cited

U.S. PATENT DOCUMENTS

| 5,204,829 | A |   | 4/1993 | Lyu et al. |
| 5,862,326 | A | * | 1/1999 | Bapat ........................ H04L 9/40 |
|           |   |   |        | 709/201 |

(Continued)

FOREIGN PATENT DOCUMENTS

| CN | 105471830 | 4/2016 |
| CN | 105721193 | 6/2016 |

(Continued)

OTHER PUBLICATIONS

Alsheikh et al., "Machine Learning in Wireless Sensor Networks: Algorithms, Strategies, and Applications," Mar. 19, 2015, pp. 1-23.

(Continued)

*Primary Examiner* — Ramy M Osman
(74) *Attorney, Agent, or Firm* — Polsinelli

(57) ABSTRACT

Aspects of the technology provide solutions for determining a time period ("epoch") required to monitor or analyze a tenant network. Some implementations of the technology include a process for making automatic epoch determinations, which includes steps for identifying one or more network parameters for a tenant network, analyzing the tenant network using the network parameters to discover one or more configuration settings of the tenant network, and determining a first epoch for the tenant network, the first epoch corresponding with a period of time to complete analysis of the tenant network using the network parameters. In some aspects, the process can further include steps for generating a tenant profile for the tenant network, the tenant profile based on the network parameters, the first epoch, and (Continued)

the one or more configuration settings of the tenant network. Systems and machine-readable media are also provided.

17 Claims, 5 Drawing Sheets

Related U.S. Application Data continuation of application No. 15/792,680, filed on Oct. 24, 2017, now Pat. No. 10,505,817.

(60) Provisional application No. 62/521,676, filed on Jun. 19, 2017.

(51) Int. Cl.
| | | |
|---|---|---|
| *H04L 41/16* | (2022.01) | |
| *G06F 11/34* | (2006.01) | |
| *H04L 41/0853* | (2022.01) | |
| *H04L 41/14* | (2022.01) | |
| *H04L 41/147* | (2022.01) | |
| *H04L 41/12* | (2022.01) | |
| *H04L 41/5025* | (2022.01) | |
| *H04L 41/5067* | (2022.01) | |
| *H04L 43/10* | (2022.01) | |
| *H04L 41/5019* | (2022.01) | |

(52) U.S. Cl.
CPC ........... *H04L 41/12* (2013.01); *H04L 41/145* (2013.01); *H04L 41/147* (2013.01); *H04L 41/16* (2013.01); *H04L 43/103* (2013.01); *H04L 41/5019* (2013.01); *H04L 41/5025* (2013.01); *H04L 41/5067* (2013.01); *H04L 43/10* (2013.01)

(58) Field of Classification Search
CPC ... H04L 43/103; H04L 41/16; H04L 41/5067; H04L 43/10; H04L 41/5019; H04L 41/5025; G06F 11/3466
See application file for complete search history.

(56) References Cited

U.S. PATENT DOCUMENTS

| | | | |
|---|---|---|---|
| 6,026,424 A * | 2/2000 | Circenis | G06F 9/54 |
| | | | 718/104 |
| 6,078,569 A | 6/2000 | Chandra | |
| 6,108,702 A | 8/2000 | Wood | |
| 6,377,987 B1 | 4/2002 | Kracht | |
| 6,512,933 B1 | 1/2003 | Kalofonos et al. | |
| 6,526,370 B1 | 2/2003 | Yu et al. | |
| 6,748,559 B1 * | 6/2004 | Pfister | H04L 43/0852 |
| | | | 714/4.2 |
| 6,763,380 B1 | 7/2004 | Mayton et al. | |
| 7,003,561 B1 * | 2/2006 | Magdych | H04L 63/1433 |
| | | | 726/25 |
| 7,003,562 B2 | 2/2006 | Mayer | |
| 7,006,448 B1 * | 2/2006 | Thio | H04L 43/0864 |
| | | | 709/224 |
| 7,089,369 B2 | 8/2006 | Emberling | |
| 7,124,181 B1 * | 10/2006 | Magdych | H04L 63/108 |
| | | | 709/224 |
| 7,127,686 B2 | 10/2006 | Dreschler et al. | |
| 7,360,064 B1 | 4/2008 | Steiss et al. | |
| 7,453,886 B1 | 11/2008 | Allan | |
| 7,505,463 B2 | 3/2009 | Schuba et al. | |
| 7,548,967 B2 | 6/2009 | Amyot et al. | |
| 7,552,201 B2 | 6/2009 | Areddu et al. | |
| 7,580,365 B2 * | 8/2009 | Klein | H04L 43/0864 |
| | | | 709/224 |
| 7,609,647 B2 | 10/2009 | Turk et al. | |
| 7,619,989 B2 | 11/2009 | Guingo et al. | |
| 7,698,561 B2 | 4/2010 | Nagendra et al. | |
| 7,743,274 B2 | 6/2010 | Langford et al. | |
| 7,765,093 B2 | 7/2010 | Li et al. | |
| 8,010,952 B2 | 8/2011 | Datla et al. | |
| 8,073,935 B2 | 12/2011 | Viswanath | |
| 8,103,480 B2 | 1/2012 | Korn et al. | |
| 8,190,719 B2 | 5/2012 | Furukawa | |
| 8,209,738 B2 | 6/2012 | Nicol et al. | |
| 8,261,339 B2 | 9/2012 | Aldridge et al. | |
| 8,312,261 B2 | 11/2012 | Rao et al. | |
| 8,375,117 B2 | 2/2013 | Venable | |
| 8,441,941 B2 | 5/2013 | McDade et al. | |
| 8,473,376 B2 | 6/2013 | Hartley et al. | |
| 8,479,267 B2 | 7/2013 | Donley et al. | |
| 8,484,693 B2 | 7/2013 | Cox et al. | |
| 8,494,977 B1 | 7/2013 | Yehuda et al. | |
| 8,554,883 B2 | 10/2013 | Sankaran | |
| 8,589,934 B2 | 11/2013 | Makljenovic et al. | |
| 8,621,284 B2 | 12/2013 | Kato | |
| 8,627,328 B2 | 1/2014 | Mousseau et al. | |
| 8,693,344 B2 | 4/2014 | Adams et al. | |
| 8,693,374 B1 | 4/2014 | Murphy et al. | |
| 8,761,036 B2 | 6/2014 | Fulton et al. | |
| 8,782,182 B2 | 7/2014 | Chaturvedi et al. | |
| 8,824,482 B2 | 9/2014 | Kajekar et al. | |
| 8,910,143 B2 | 12/2014 | Cohen et al. | |
| 8,914,843 B2 | 12/2014 | Bryan et al. | |
| 8,924,798 B2 | 12/2014 | Jerde et al. | |
| 9,019,840 B2 | 4/2015 | Salam et al. | |
| 9,038,151 B1 | 5/2015 | Chua et al. | |
| 9,055,000 B1 | 6/2015 | Ghosh et al. | |
| 9,106,555 B2 | 8/2015 | Agarwal et al. | |
| 9,137,096 B1 | 9/2015 | Yehuda et al. | |
| 9,246,818 B2 | 1/2016 | Deshpande et al. | |
| 9,264,922 B2 | 2/2016 | Gillot et al. | |
| 9,276,877 B1 | 3/2016 | Chua et al. | |
| 9,319,300 B2 | 4/2016 | Huynh Van et al. | |
| 9,344,348 B2 | 5/2016 | Ivanov et al. | |
| 9,363,185 B2 | 6/2016 | Harrang et al. | |
| 9,369,434 B2 | 6/2016 | Kim et al. | |
| 9,389,993 B1 | 7/2016 | Okmyanskiy et al. | |
| 9,405,553 B2 | 8/2016 | Branson et al. | |
| 9,444,842 B2 | 9/2016 | Porras et al. | |
| 9,497,207 B2 | 11/2016 | Dhawan et al. | |
| 9,497,215 B2 | 11/2016 | Vasseur et al. | |
| 9,544,224 B2 | 1/2017 | Chu et al. | |
| 9,548,965 B2 | 1/2017 | Wang et al. | |
| 9,553,845 B1 | 1/2017 | Talmor et al. | |
| 9,571,502 B2 | 2/2017 | Basso et al. | |
| 9,571,523 B2 | 2/2017 | Porras et al. | |
| 9,594,640 B1 | 3/2017 | Chheda | |
| 9,596,141 B2 | 3/2017 | McDowall | |
| 9,641,249 B2 | 5/2017 | Kaneriya et al. | |
| 9,654,300 B2 | 5/2017 | Pani | |
| 9,654,361 B2 | 5/2017 | Vasseur et al. | |
| 9,654,409 B2 | 5/2017 | Yadav et al. | |
| 9,660,886 B1 | 5/2017 | Ye et al. | |
| 9,660,897 B1 | 5/2017 | Gredlr | |
| 9,667,645 B1 | 5/2017 | Belani et al. | |
| 9,680,875 B2 | 6/2017 | Knjazhhin et al. | |
| 9,686,180 B2 | 6/2017 | Chu et al. | |
| 9,686,296 B1 | 6/2017 | Murchison et al. | |
| 9,690,644 B2 | 6/2017 | Anderson et al. | |
| 9,781,004 B2 | 10/2017 | Danait et al. | |
| 9,787,559 B1 | 10/2017 | Schroeder | |
| 9,998,247 B1 | 6/2018 | Choudhury et al. | |
| 10,084,795 B2 | 9/2018 | Akireddy et al. | |
| 10,084,833 B2 | 9/2018 | McDonnell et al. | |
| 10,084,895 B2 | 9/2018 | Kasat et al. | |
| 10,200,272 B1 | 2/2019 | Trundle | |
| 10,505,817 B2 | 12/2019 | Narsude et al. | |
| 10,541,889 B1 | 1/2020 | Mishra et al. | |
| 2002/0143855 A1 | 10/2002 | Traversat et al. | |
| 2002/0152432 A1 | 10/2002 | Fleming | |
| 2002/0174217 A1 | 11/2002 | Anderson | |
| 2003/0229693 A1 | 12/2003 | Mahlik et al. | |
| 2004/0073647 A1 | 4/2004 | Gentile et al. | |
| 2004/0168100 A1 | 8/2004 | Thottan et al. | |
| 2005/0108389 A1 | 5/2005 | Kempin et al. | |

(56) References Cited

U.S. PATENT DOCUMENTS

| | | |
|---|---|---|
| 2006/0029007 A1 | 2/2006 | Ayyagari |
| 2006/0187916 A1 | 8/2006 | Vasseur et al. |
| 2006/0221851 A1* | 10/2006 | Klein ............... H04L 43/0864 370/252 |
| 2007/0011629 A1 | 1/2007 | Shacham et al. |
| 2007/0081472 A1 | 4/2007 | Chiang et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2008/0195265 A1 | 8/2008 | Searle et al. |
| 2008/0298314 A1* | 12/2008 | Dawson ............... H04W 48/18 370/329 |
| 2009/0164629 A1* | 6/2009 | Klein ............... H04L 43/0864 709/224 |
| 2009/0240758 A1 | 9/2009 | Pasko et al. |
| 2009/0249284 A1 | 10/2009 | Antosz et al. |
| 2010/0080145 A1 | 4/2010 | Frietsch et al. |
| 2010/0121949 A1 | 5/2010 | Cho |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0199924 A1 | 8/2011 | Breslin et al. |
| 2011/0263251 A1* | 10/2011 | Chen .................... H04W 48/16 455/434 |
| 2011/0295983 A1 | 12/2011 | Medved et al. |
| 2012/0054163 A1 | 3/2012 | Liu et al. |
| 2012/0191516 A1 | 7/2012 | Taicher |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0144888 A1 | 6/2013 | Faith et al. |
| 2013/0279438 A1 | 10/2013 | Kwon et al. |
| 2014/0019597 A1 | 1/2014 | Nath et al. |
| 2014/0128067 A1 | 5/2014 | Lim et al. |
| 2014/0177638 A1 | 6/2014 | Bragg et al. |
| 2014/0201359 A1 | 7/2014 | Uppalli et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0215107 A1* | 7/2015 | Siomina ............... H04L 5/16 370/281 |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1 | 2/2016 | Erickson et al. |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0112545 A1 | 4/2016 | He et al. |
| 2016/0149751 A1 | 5/2016 | Pani et al. |
| 2016/0164748 A1 | 6/2016 | Kim |
| 2016/0218918 A1* | 7/2016 | Chu ....................... H04L 41/12 |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0262090 A1 | 9/2016 | Marin et al. |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamnhan et al. |
| 2016/0380892 A1 | 12/2016 | Mahadevan et al. |
| 2017/0026292 A1 | 1/2017 | Smith et al. |
| 2017/0026495 A1* | 1/2017 | Gyorffy ............... G06F 11/3419 |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0111259 A1 | 4/2017 | Wen et al. |
| 2017/0118167 A1 | 4/2017 | Subramanya et al. |
| 2017/0126740 A1 | 5/2017 | Bejarano et al. |
| 2017/0126792 A1 | 5/2017 | Halpern et al. |
| 2017/0134233 A1 | 5/2017 | Dong et al. |
| 2017/0163442 A1 | 6/2017 | Shen et al. |
| 2017/0187577 A1 | 6/2017 | Nevrekar et al. |
| 2017/0195187 A1 | 7/2017 | Bennett et al. |
| 2017/0206129 A1 | 7/2017 | Yankilevich et al. |
| 2017/0222873 A1 | 8/2017 | Lee et al. |
| 2018/0069754 A1 | 3/2018 | Dasu et al. |
| 2018/0167294 A1 | 6/2018 | Gupta et al. |
| 2018/0248768 A1 | 8/2018 | Ibrahim Rana et al. |
| 2018/0367411 A1 | 12/2018 | Narsude et al. |
| 2018/0367416 A1 | 12/2018 | Nagarajan et al. |
| 2019/0116626 A1 | 4/2019 | Zhao |
| 2020/0213205 A1* | 7/2020 | Savoor .................. H04L 41/40 |
| 2021/0111982 A1 | 4/2021 | Nelson et al. |
| 2022/0178246 A1 | 6/2022 | Hird et al. |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | 2015014177 | 2/2015 |
| WO | 2015187337 | 12/2015 |
| WO | 2016011888 | 1/2016 |
| WO | 2016039730 | 3/2016 |
| WO | 2016072996 | 5/2016 |
| WO | 2016085516 | 6/2016 |
| WO | 2016093861 | 6/2016 |
| WO | 2016119436 | 8/2016 |
| WO | 2016130108 | 8/2016 |
| WO | 2016161127 | 10/2016 |
| WO | 2017031922 | 3/2017 |
| WO | 2017039606 | 3/2017 |
| WO | 2017105452 | 6/2017 |

OTHER PUBLICATIONS

Acunetix, "How long does a scan take to complete?" Mar. 20, 2014, 1 page, https://www.acunetix.com/blog/docs/how-long-does-a-scan-take-to-complete/.

Acunetix, "FAQ: How Long does Web Scanning take with Acunetix Web Vulnerability Scanner?," Mar. 29, 2012, 2 pages, https://www.acunetix.com/blog/docs/faq-web-scanning-duration/.

Juniper, "Scan duration and ports scanning," Feb. 23, 2018, 3 pages, https://www.juniper.net/documentation/en_US/jsa7.3.2/jsa-managing-vulnerability-user-guide/topics/concept/jsa-vuln-scan-duration-and-ports-scanning.html.

English Abstract for CN application No. 105471830, 6 pages.
English Abstract for CN application No. 105721193, 21 pages.
English Abstract for CN application No. 105721297, 10 Pages.
English Abstract for CN application No. 106130766, 11 Pages.
English Abstract for CN application No. 106603264, 11 pages.
English Abstract for CN application No. 103701926, 23 pages.

(56) References Cited

OTHER PUBLICATIONS

Akella, Aditya, et al., "A highly Available Software Defined Fabric," HotNets-XIII, Oct. 27-28, 2014, Los Angeles, CA, USA, Copyright 2014, ACM, pp. 1-7.
Author Unknown, "Aids to Pro-active Management of Distributed Resources through Dynamic Fault-Localization and Availability Prognosis," FaultLocalization-TR01-CADlab, May 2006, pp. 1-9.
Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.
Cisco Systems, Inc., "Cisco Application Centric Infrastructure 9ACI Endpoint Groups (EPG) Usage and Design," White Paper, May 2014, pp. 1-14.
Cisco Systems, Inc., "The Cisco Application Policy Infrastructure Controller Introduction: What is the Cisco Application Poly Infrastructure Controller?", Jul. 31, 2014, 19 pages.
Cisco, "Verify Contracts and Rules in the ACI Fabric," Cisco, Updated Aug. 19, 2016, Document ID: 119023, pp. 1-20.
De Silva et al., "Network-wide Security Analysis," Semantic Scholar, Oct. 25, 2011, pp. 1-11.
Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.
Fayaz, Seyed K., et al., "Efficient Network Reachability Analysis using a Succinct Control Plane Representation," 2016, ratul.org pp. 1-16.
Feldmann, Anja, et al., "IP Network Configuration for Intradomain Traffic Engineering," Semantic Scholar, accessed on Jul. 20, 2017, pp. 1-27.
Han, Wonkyu, et al., "LPM: Layered Policy Management for Software-Defined Networks," Mar. 8, 2016, pp. 1-18.
Han, Yoonseon, et al., "An Intent-based Network Virtualization Platform for SDN," 2016 I FIP, pp. 1-6.
Jain, Praveen, et al., "In-Line Distributed and Stateful Security Policies for Applications in a Network Environment," Cisco Systems, Inc., Aug. 16, 2016, 13 pages.
Kazemian, Peyman, et al., "Real Time Network Policy Checking using Header Space Analysis," USENIX Association, 10th USENIX Symposium on Networked Systems Design and Implementation (NSDI'13) pp. 99-111.
Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.
Le, Franck, et al., "Minerals: Using Data Mining to Detect Router Misconfigurations," CyLab, Carnegie Mellon University, CMU-CyLab-06-008, May 23, 2006, pp. 1-14.
Liang, Chieh-Jan Mike, et al., "SIFT: Building an Internet of Safe Things," Microsoft, IPSN' 15, Apr. 14-16, 2015, Seattle, WA< ACM 978, pp. 1-12.
Lindem, A., et al., "Network Device YANG Organizationa Model draft-rtgyangdt-rtgwg-device-model-01," Network Group, Internet-draft, Sep. 21, 2015, pp. 1-33.
Liu, Jason, et al., "A Real-Time Network Simulation Infrastructure Based on Open VPN," Journal of Systems and Software, Aug. 4, 2008, pp. 1-45.
Lopes, Nuno P., et al., "Automatically verifying reachability and well-formedness in P4 Networks," Microsoft, accessed on Jul. 18, 2017, pp. 1-13.
Mai, Haohui, et al., "Debugging the Data Plane with Anteater," SIGCOMM11, Aug. 15-19, 2011, ∞. 1-12.
Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.
Miller, Nancy, et al., "Collecting Network Status Information for Network-Aware Applications," INFOCOM 2000, pp. 1-10.
Miranda, Joao Sales Henriques,, "Fault Isolation in Software Defined Networks," www.gsd.inescid.pt , pp. 1-10.
Moon, Daekyeong, et al., "Bridgin the Software/Hardware Forwarding Divide," Berkeley.edu, Dec. 18, 2010, pp. 1-15.
Panda, Aurojit, et al., SCL: Simplifying Distributed SDN Control Planess, people .eecs.bekeleu. edu, Mar. 2017, pp. 1-17.
Shin, Seugwon, et al., "FRESCO: Modular Composabe Security Services for Software-Defined Networks," To appear in the ISOC Network and Distributed System Security Symposium, Feb. 2013, pp. 1-16.
Shukla, Apoorv, et al., "Towards Meticulous Data Plane Monitoring," kaust.edu.sa, access on Aug. 1, 2017, pp. 1-2.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA'07) Nov. 11-16, 2007, pp. 1-14.
Vega, Andrews, et al., "Troubleshooting Cisco Application Centric Infrastructure: Analytical Problem Solving Applied to the Policy Driven Data Center," Feb. 15, 2016, 84 pages.
Xia, Wenfeng, et al., "A Surevey on Software-Defined Networking," IEEE Communications Surveys and Tutorials, Mar. 16, 2015, pp. 27-51.
Yu et al., "A Flexible Framework for Wireless-Based Intelligent Sensor with Reconfigurability, Dynamic adding, and Web Interface," Conference Paper, Jul. 24, 2006, IEEE 2006, pp. 1-7.
Zhou, Shijie, et al., "High-Performance Packet Classification on GUP," 2014 IEEE, pp. 1-6.

* cited by examiner

AUTOMATICALLY DETERMINING AN OPTIMAL AMOUNT OF TIME FOR ANALYZING A DISTRIBUTED NETWORK ENVIRONMENT

CROSS-REFERENCE TO RELATED APPLICATIONS

This application is a continuation of U.S. Non-Provisional patent application Ser. No. 16/704,874, filed Dec. 5, 2019, which is a continuation of U.S. Non-Provisional patent application Ser. No. 15/792,680, filed Oct. 24, 2017, now U.S. Pat. No. 10,505,817, which claims the benefit of U.S. Provisional Patent Application No. 62/521,676, filed Jun. 19, 2017, the contents of which are incorporated herein by reference in their entireties.

BACKGROUND

1. Technical Field

The present technology pertains to network configuration and troubleshooting, and more specifically to systems and methods for automatically configuring a time period for which a network monitoring appliance can be used to analyze a tenant network configuration.

2. Introduction

Network configurations for large data center networks are often specified at a centralized controller. The controller can realize the intent in the network by programming switches and routers in the data center according to the specified network configurations. Network configurations are inherently very complex, and involve low level as well as high level configurations of several layers of the network such as access policies, forwarding policies, routing policies, security policies, QoS policies, etc. Given such complexity, the network configuration process is error prone.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
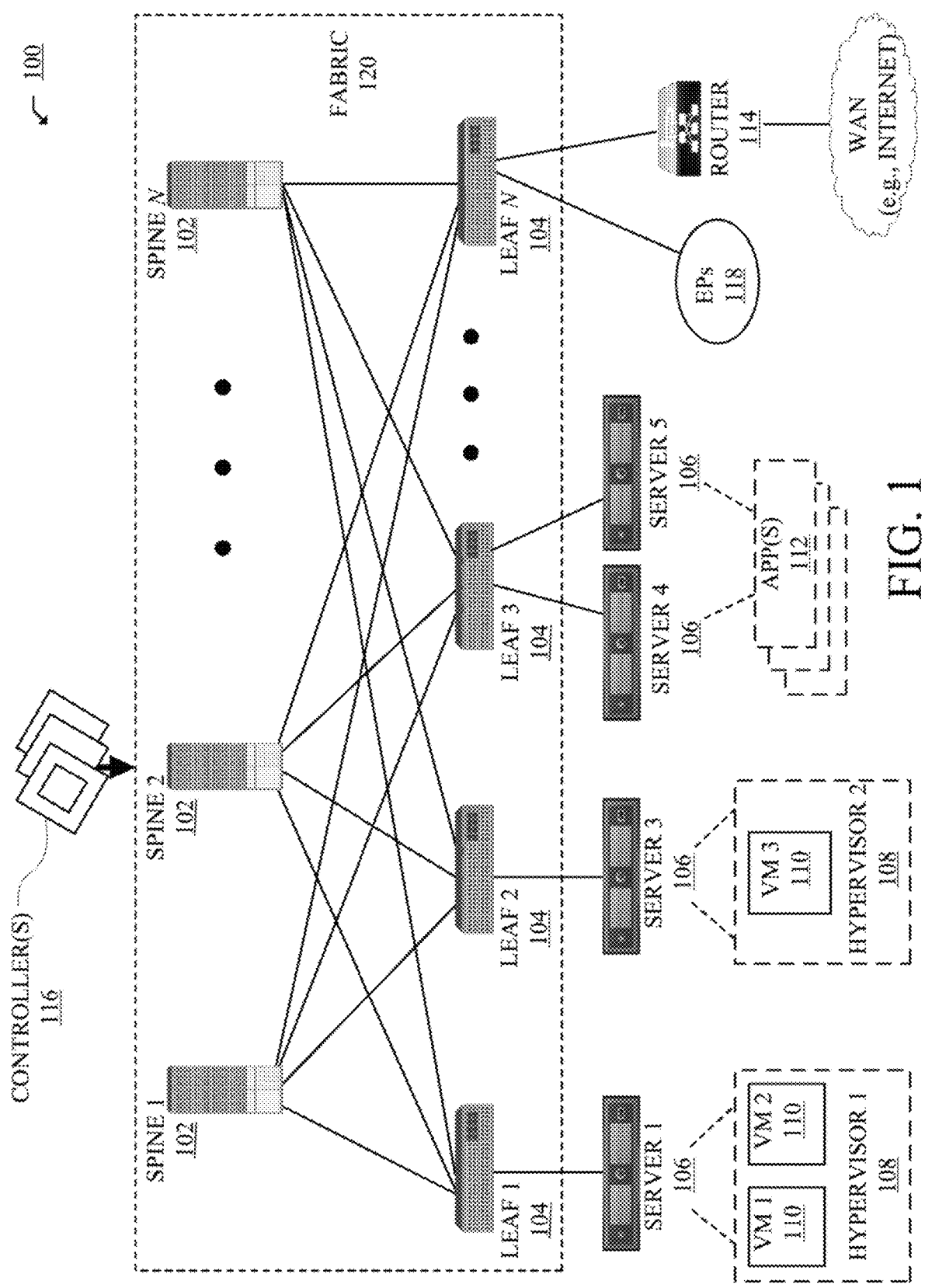
FIG. 1 illustrates an example network environment in which some aspects of the technology can be implemented.

The detailed description set forth below is intended as a description of various configurations of the disclosed technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview:

In some computer network implementations, one or more network systems (e.g., "network appliances" or "appliances") can be configured to be connected to and monitor the network fabric. Such deployments can be used to help troubleshoot customer (e.g. tenant) networking issues, to ensure conformity with agreed-upon networking policies such as service level agreements (SLAs), and to ensure an overall high quality of tenant experience.

One limitation of conventional appliance deployments is that many parameters of the connected fabric are unknown. For example, tenants that utilize the appliance for network monitoring may not know, or may not provide accurate network parameters needed to determine how long the appliance needs to run, for example to complete one monitoring "epoch."

Description:

Aspects of the disclosed technology provide systems and methods for performing tenant network monitoring and for automatically determining a time duration (i.e., an "epoch" or "epoch duration") needed to complete tenant network analysis.

In some aspects, initial epoch estimates may be made based on one or more network parameters that are provided before network analysis/monitoring is performed. Network parameters can include any initial information provided to the monitoring appliance that may be used to infer one or more characteristics of the tenant network to be monitored. By way of example, network parameters can include indications of a tenant name, identification of various physical or virtual devices in the tent network fabric, and/or information regarding the tenant network topology.

Initial analysis of the tenant network can be performed for an unbounded duration of time, for example, to give the monitoring appliance an opportunity to determine an approximate epoch. Through tenant network analysis, or more previously unknown configuration settings of the tenant network can be discovered by the appliance. Once additional tenant network configuration settings have been identified and the network analysis has been concluded, a first epoch can be determined based upon the amount of time required to complete the initial analysis/monitoring. A tenant profile (or tenant network profile) can be generated for the tenant network, for example, that includes information regarding the network parameters, configuration settings, and epoch information.

As discussed in further detail below, the tenant profile can be stored, for example to a network accessible database, and updated through additional analysis of the tenant network. In some aspects, the tenant profile can be updated in response to analysis of one or more different network fabrics, for example, that share characteristics or properties similar to the tenant network.

In some aspects, machine-learning implementations can be deployed for the monitoring of various different tenant networks, and tenant network profiles can be updated accordingly. In such implementations, a predicted epoch for a particular network can be based on one or more machine learning models.

By way of example, a monitoring appliance of the subject technology can be performed to implement a tenant network monitoring process that includes steps for identifying one or more network parameters for a tenant network, analyzing the tenant network using the network parameters, and determining a first epoch for the tenant network, the first epoch corresponding with a period of time to complete analysis of the tenant network using the network parameters. In some aspects, the process can further include steps for generating a tenant profile for the tenant network, the tenant profile based on the network parameters, the first epoch, and the one or more configuration settings of the tenant network.

In some approaches, the first epoch is longer than the time period required for subsequent network analysis because many of the tenant network configuration settings and parameters may be unknown. Consequently, epochs for subsequent analysis/monitoring may be shorter.

The disclosure now turns to FIG. 1, which illustrates a diagram of an example network environment 100, such as a data center. Network 100 can include a Fabric 120 which can represent the physical layer or infrastructure (e.g., underlay) of the network 100. Fabric 120 can include Spines 102 (e.g., spine routers or switches) and Leafs 104 (e.g., leaf routers or switches) which can be interconnected for routing traffic in the Fabric 120. The Spines 102 can interconnect the Leafs 104 in the Fabric 120, and the Leafs 104 can connect the Fabric 120 to the overlay portion of the network 100, which can include application services, servers, virtual machines, containers, endpoints, etc. Thus, network connectivity in the Fabric 120 can flow from Spines 102 to Leafs 104, and vice versa. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies. Network policies can be driven by the one or more controllers 116 and/or the Leafs 104. The Leafs 104 can connect Servers 106, Hypervisors 108, Virtual Machines (VMs) 110, Applications 112, Endpoints 118, External Routers 114, etc., with the Fabric 120. For example, Leafs 104 can encapsulate and decapsulate packets to and from Servers 106 in order to enable communications throughout the network 100, including the Fabric 120. Leafs 104 can also provide any other devices, services, tenants, or workloads with access to the Fabric 120.

The Applications 112 can include software applications, services, operators, containers, appliances, functions, service chains, etc. For example, the Applications 112 can include a firewall, a database, a CDN server, an IDS/IPS, a deep packet inspection service, a message router, a virtual switch, etc. VMs 110 can be virtual machines hosted by Hypervisors 108 running on Servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can each host one or more VMs 110.

In some cases, VMs 110 and/or Hypervisors 108 can be migrated to other Servers 106. Servers 106 can similarly be migrated to other locations in the network environment 100. For example, a server connected to a specific leaf can be changed to connect to a different or additional leaf. Such configuration or deployment changes can involve modifications to settings and policies that are applied to the resources being migrated.

In some cases, one or more Servers 106, Hypervisors 108, and/or VMs 110 can represent a tenant or customer space. Tenant space can include workloads, services, applications, devices, and/or resources that are associated with one or more clients or subscribers. Accordingly, traffic in the network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, and configuration information between tenants can be managed by one or more controllers 116.

Policies, configurations, settings, etc., in the network can be implemented at the application level, the physical level, and/or both. For example, one or more controllers 116 can define a policy model at the application level which defines policies and other settings for groups of applications or services, such as endpoint groups. In some addition, the Leafs 104, as well as other physical devices such as physical servers or Spines 102, can apply specific policies to traffic. For example, Leafs 104 can apply specific policies or contracts to traffic based on tags or characteristics of the traffic, such as protocols associated with the traffic, applications or endpoint groups associated with the traffic, network address information associated with the traffic, etc.

In some examples, network 100 can be configured according to a particular software-defined network (SDN) solution. The network 100 can deploy one or more SDN solutions, such as CISCO ACI or VMWARE NSX solutions. These example SDN solutions are briefly described below.

ACI is an example SDN solution which can be implemented in the network 100. ACI can provide an application policy-based solution through scalable distributed enforcement. ACI supports integration of physical and virtual environments under a declarative policy model for networks, servers, services, security, requirements, etc. For example, the ACI framework implements End Point Groups (EPGs), which can include a collection of endpoints or applications that share common policy requirements, such as security, QoS, services, etc. Endpoints can be virtual/logical or physical devices, such as VMs and bare-metal physical servers that are connected to the network 100. Endpoints can have one or more attributes such as VM name, guest OS name, a security tag, etc. Application policies can be applied between EPGs, instead of endpoints directly, in the form of contracts. The Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, and physical hosts. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more controllers 116, such as an application policy infrastructure controller (APIC). The Leaf 104 can classify to which EPG the traffic from a host belong and enforce policies accordingly.

Another example SDN solution is based on VMWare NSX. With VMWare NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, from our previous example, DFW rules can be configured to block HTTP traffic between web, application, and database security groups.

Network 100 may deploy different hosts via the Leafs 104, Servers 106, Hypervisors 108, VMs 110, Applications 112, Controllers 116, and/or Endpoints 118, such as VMware ESXi hosts, Windows Hyper-V hosts, bare metal physical hosts, etc. The network 100 may interoperate with a wide variety of Hypervisors 108, Servers 106 (e.g., physical and/or virtual servers), SDN orchestration platforms, etc. The network 100 may implement a declarative model to allow its integration with application design and holistic network policy.

One or more controllers 116 can provide centralized access to fabric information, application configuration, resource configuration, application-level policy modeling for a software-defined network (SDN) infrastructure, integration with management systems or servers, etc. The one or more controllers 116 can form a control plane that interfaces with an application plane via northbound APIs and a data plane via southbound APIs. In some examples, the one or more controllers 116 can include SDN controllers or managers, such as an application policy infrastructure controller (APIC) or a vCenter NSX Manager.

As previously noted, controllers 116 can define and manage application-level model(s) for policies in the network 100. In some cases, application or device policies can also be managed and/or defined by other components in the network. For example, a hypervisor or virtual appliance, such as a VM or container, can run a server or management tool to manage software and services in the network 100, including policies and settings for virtual appliances.

Network 100 can include one or more different types of SDN solutions, hosts, etc. For the sake of clarity and explanation purposes, the examples in the following disclosure will be described in the context of an ACI solution implemented in the network 100, and the one or more controllers 116 may be interchangeably referenced as APIC controllers. However, it should be noted that the technologies and concepts herein are not limited to ACI architectures and may be implemented in other architectures and configurations, including other SDN solutions as well as other types of networks which may not deploy an SDN solution.

Further, as referenced herein, the term "hosts" can refer to servers 106 (e.g., physical or logical), Hypervisors 108, VMs 110, containers (e.g., Applications 112), EPs 118, etc., and can run or include any type of server or application solution. Non-limiting examples of "hosts" can include DVS virtual servers, vCenter and NSX Managers, bare metal physical hosts, AVS hosts, Hyper-V hosts, VMs, Docker Containers, Virtual Routers/Switches (e.g., VPP), etc.

Figure 2:
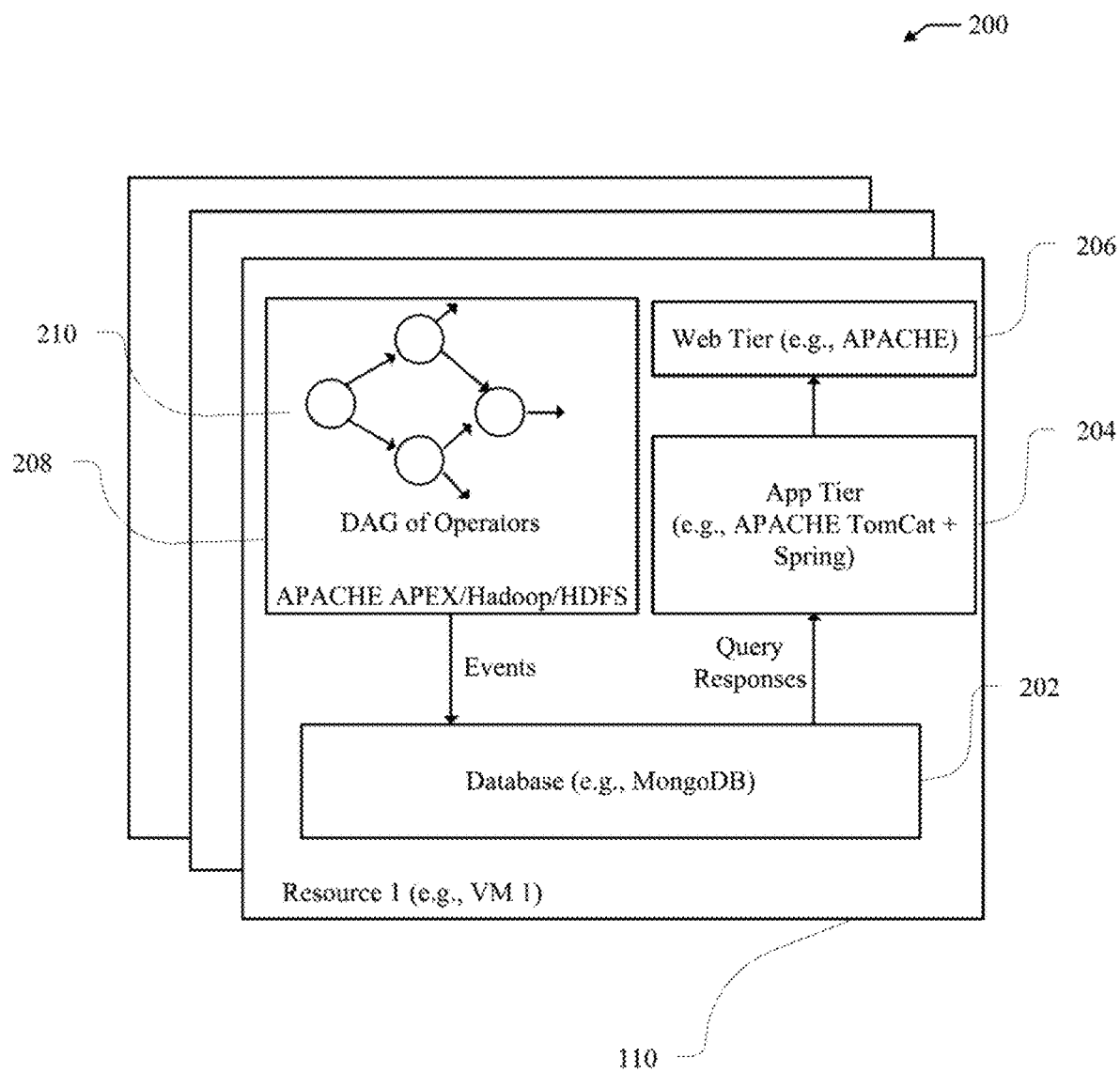
FIG. 2 illustrates an example network assurance appliance, according to some aspects of the technology.

FIG. 2 illustrates a diagram of an example Assurance Appliance 200 for network assurance, including policy and QoS assurance. Appliance 200 can be configured to perform network analysis and/or monitoring of a tenant network, or a portion of a network fabric.

Appliance 200 can include a processing chain, for example, that is made up of an ordered series of operators, as discussed above. In this example, the Appliance 200 can include k VMs 110 operating in cluster mode. VMs are used in this example for explanation purposes. However, it should be understood that other configurations are also contemplated herein, such as use of containers, bare metal devices, or any other hardware and/or software systems. Moreover, while FIG. 2 illustrates a cluster mode configuration, other configurations are also contemplated herein, such as a single mode configuration, e.g., single VM, container, or server.

Appliance 200 can run on one or more Servers 106, VMs 110, Hypervisors 108, EPs 118, Leafs 104, or any other system. For example, Appliance 200 can be a logical service or application running on one or more VMs 110 in the network 100. Appliance 200 can include a big-data framework 208, which can be based on, for example, APACHE APEX and HADOOP. In some cases, assurance checks can be written as individual operators that reside in the APEX framework. This enables a natively horizontal scale-out architecture that can scale to arbitrary number of switches in the Fabric 120 (e.g., ACI fabric (e.g., Fabric 120)).

Assurance Appliance 200 can poll Fabric 120 at a configurable periodicity (e.g., an epoch). The analysis workflow can be setup as a DAG (Directed Acyclic Graph) of Operators 210, where data flows from one operator to another and eventually results are generated and persisted to Database 202 for each interval (e.g., each epoch).

The north-tier implements API Server (e.g., APACHE Tomcat and Spring framework) 204 and Web Server 206. A graphical user interface (GUI) interacts via the APIs exposed to the customer. These APIs can also be used by the customer to collect data from Assurance Appliance 200 for further integration into other tools.

Operators 210 in Data Framework 208 (e.g., APEX/Hadoop) can together support assurance operations. Below are non-limiting examples of assurance operations that can be performed by Assurance Appliance 200 via Operators 210.

Security Policy Adherence

Assurance Appliance 200 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 200 can check for issues in the specification of the user's intent or intents (e.g., identify contradictory or conflicting policies in L_Model 270A).

TCAM Utilization

TCAM is a scarce resource in the fabric (e.g., Fabric 120). However, Assurance Appliance 200 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 200 can validate that the fabric (e.g. fabric 120) has no inconsistencies in the Endpoint information registered (e.g., two leafs announcing the same endpoint, duplicate subnets, etc.), among other such checks.

Tenant Routing/Forwarding Checks

Assurance Appliance 200 can validate that BDs, VRFs, subnets (both internal and external), VLANs, contracts, filters, applications, EPGs, etc., are correctly programmed.

Infrastructure Routing

Assurance Appliance 200 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance 200 can validate rules in the specification of the network (e.g., L_Model 270A) are complete and do not have inconsistencies or other problems. MOs in the MIM 200 can be checked by Assurance Appliance 200 through syntactic and semantic checks performed on L_Model 270A and/or the associated configurations of the MOs in MIM 200. Assurance Appliance 200 can also verify that unnecessary, stale, unused or redundant configurations, such as contracts, are removed.

As discussed above, Appliance 200 can be used poll/monitor a tenant network (e.g., fabric 120) at an automatically configurable periodicity (e.g., an epoch). In some aspects, estimated epochs can be pre-configured based on one or more network parameters, for example, that are provided by a tenant, such as a number and type of network devices in the network fabric. For example, the tenant's configuration may indicate that the fabric contains 20 spine switches, and 40 leaf routers. As such, the pre-configured time estimate for a similar fabric may be designated at 5 minutes.

In other aspects, epoch estimates can be based on historic statistical information for fabrics of similar device types and/or configuration. For example, if multiple previous fabrics having about 20 spine switches, and about 40 leaf routers were analyzed in about 5 minutes, then a similar time estimate can be provided for similar network configurations with similar numbers of network devices.

In some implementations, epoch estimates can be based on one or more tenant network profiles (e.g., tenant profiles), for which configuration information is updated over time. As discussed above, tenant profiles can also be maintained in a database that is periodically updated by one or more machine-learning algorithms.

In some aspects, a tenant network cluster may be brought up without setting an initial epoch for the appliance. In such instances, the appliance is permitted to perform monitoring and analysis for an indefinite duration of time to determine the length of the epoch i.e., a time period required for processing to be completed by each operator in the application for analysis of the network fabric. Once analysis is complete, the appliance can repeat the analysis over the same fabric for a number of iterations to determine multiple epoch values. From the collected distribution of epoch values, various forms of statistical analysis can be performed to determine the epoch length for the fabric, and/or for similar fabrics. In some aspects, the epoch averages and configuration settings of the tenant network can be stored to the tenant profile, as discussed above.

In some aspects, epoch estimations may also be based on connection parameters between the monitoring appliance and tenant network. For example, an appliance that is connected to a tenant network that is geographically distant may require a greater epoch time than if the tenant network and appliance are proximately positioned.

Figure 3:
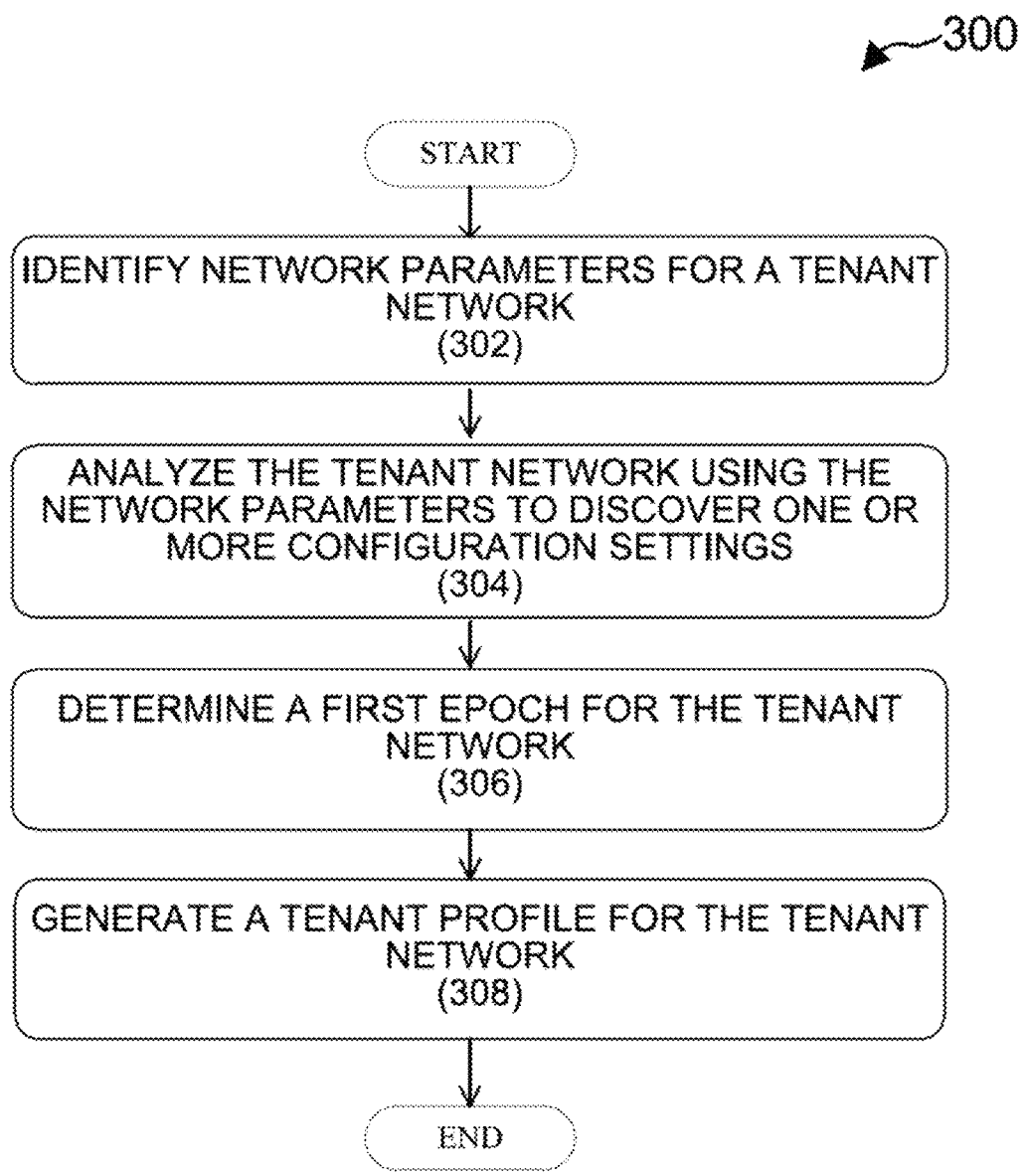
FIG. 3 illustrates steps of an example process for determining a network analysis epoch, according to some aspects of the technology.

FIG. 3 illustrates steps of an example process 300 for determining a network analysis epoch, according to some aspects of the technology. Process 300 begins with step 302 in which one or more network parameters for a tenant network are identified. As used herein, network parameters can include any type of information that describes, or can be used to infer, any parameter or configuration of the tenant network.

By way of non-limiting example, network parameters can include a number of leaf and/or spine switches in the tenant network, configuration settings of any of the tenant devices, and/or an identifier of the respective tenant. Network parameter information can also include information about events that occurred in a previous epoch, e.g., that are retrieved from a cache of results that can be used to optimize the next epoch, or at the beginning of an epoch, such as information regarding any changes in the network configuration. In practice, network parameters can include information that is provided by the tenant, for example, for purpose of helping to facilitate analysis by a network appliance on the tenant network.

In step 304, a tenant network is analyzed (e.g., by the network appliance). Analysis of the tenant network can be performed to monitor to discover one or more configuration settings of the network, and to diagnose network issues. As used herein, configuration settings can include any feature or aspect of the tenant network that was not provided by the network parameters.

As discussed above, the initial analysis of the tenant network performed by the appliance can proceed for an indefinite time period, i.e., an unlimited epoch. For example, because certain configuration settings for the tenant network may be unknown, the monitoring appliance may not initially be configured for a definite epoch time. By enabling the appliance to perform monitoring/analysis for an indefinite period of time an initial (first) epoch for the tenant network can be determined.

In step 306, once the analysis has been completed, the first epoch is determined. Subsequently, in step 308, the first epoch, as well as details of the tenant network (e.g., network parameters and configuration settings) can be saved to a database.

As discussed above, additional analysis of the tenant network can be performed to more accurately determine an epoch duration that may be used for later analysis/monitoring. Additional network monitoring/analysis can be performed using all information known about the tenant network. For example, additional monitoring can be performed using the benefit of network parameters received in step 302, as well as one or more configuration settings discovered in the initial tenant network analysis (step 304). In some aspects, epochs for subsequent network analysis can be recorded. For example, a second epoch can be determined for the second network analysis and used to update the tenant profile stored in step 308.

In some instances, various recorded measures of epochs can be used to predict the duration of time needed to monitor the same (or a different) tenant network. For example, the first and second epochs may be used to compute a mean, median and/or exponential average epoch time that can be used to predict a likely time period needed by the appliance to perform additional monitoring and/or analysis. In another example, the median of multiple measured epochs may be used to predict the duration of future network analysis or monitoring. Other statistical calculations or models may be implemented, without departing from the scope of the technology.

In some approaches, the tenant profile (e.g., network profile) can be used to make predictions about epochs for different networks, such as, networks that share a common tenant, or that are determined to have a high degree of similarity based on their respective network parameters, etc.

In some implementations, the database can be perpetually updated with tenant profile information, for example, from analysis/monitoring that is performed for multiple different tenant networks. Using continuously updated tenant profile information, the database can be used to inform and continuously improve the appliance's monitoring/analysis on virtually any number tenant networks. As such, when used in conjunction with a machine learning algorithm, the monitoring application can be used to continuously update epoch predictions for both know networks, and unknown networks for which no historic epoch information is available.

Figure 4:
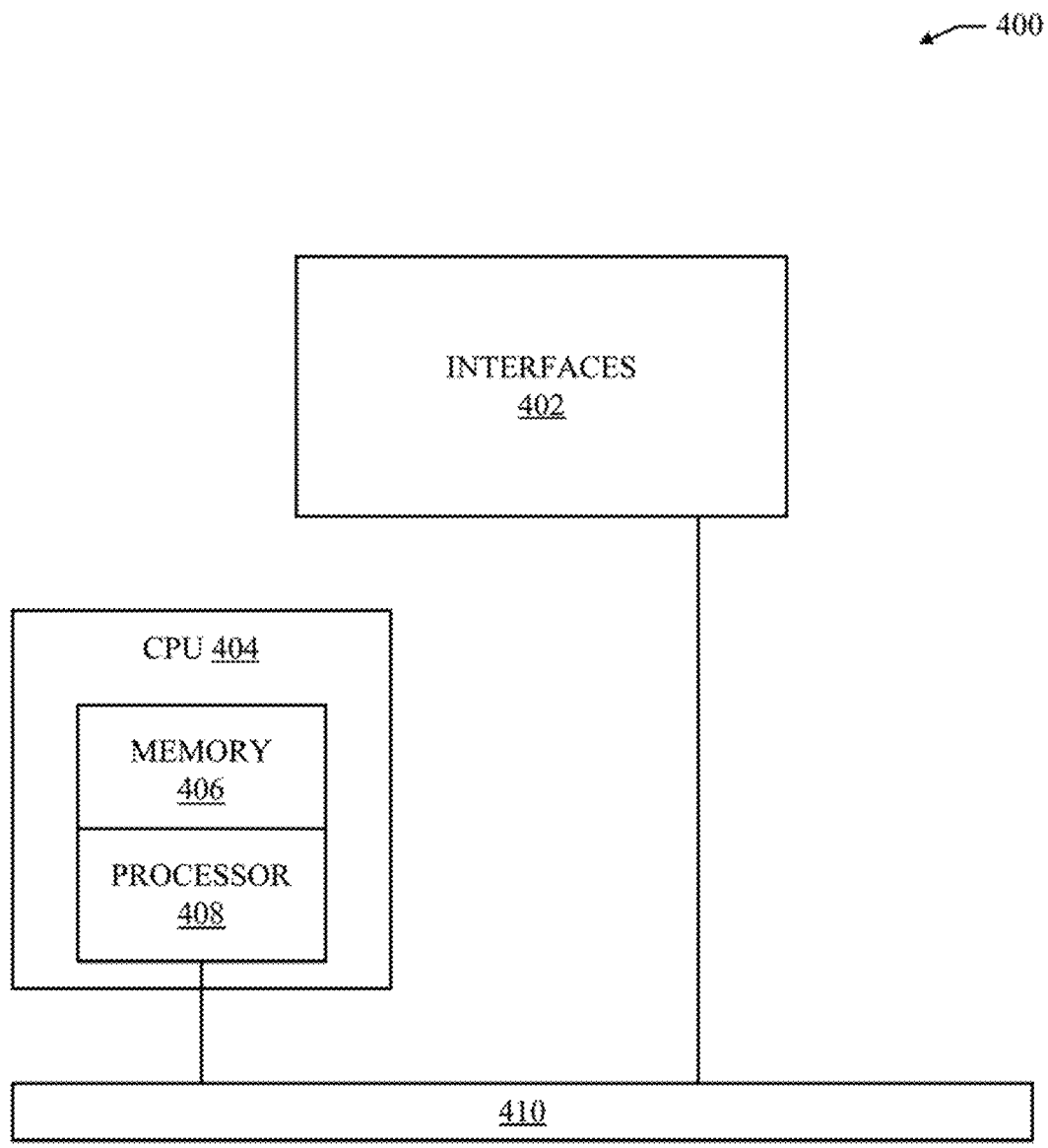
FIG. 4 illustrates an example network device in accordance with various embodiments.
Figure 5:
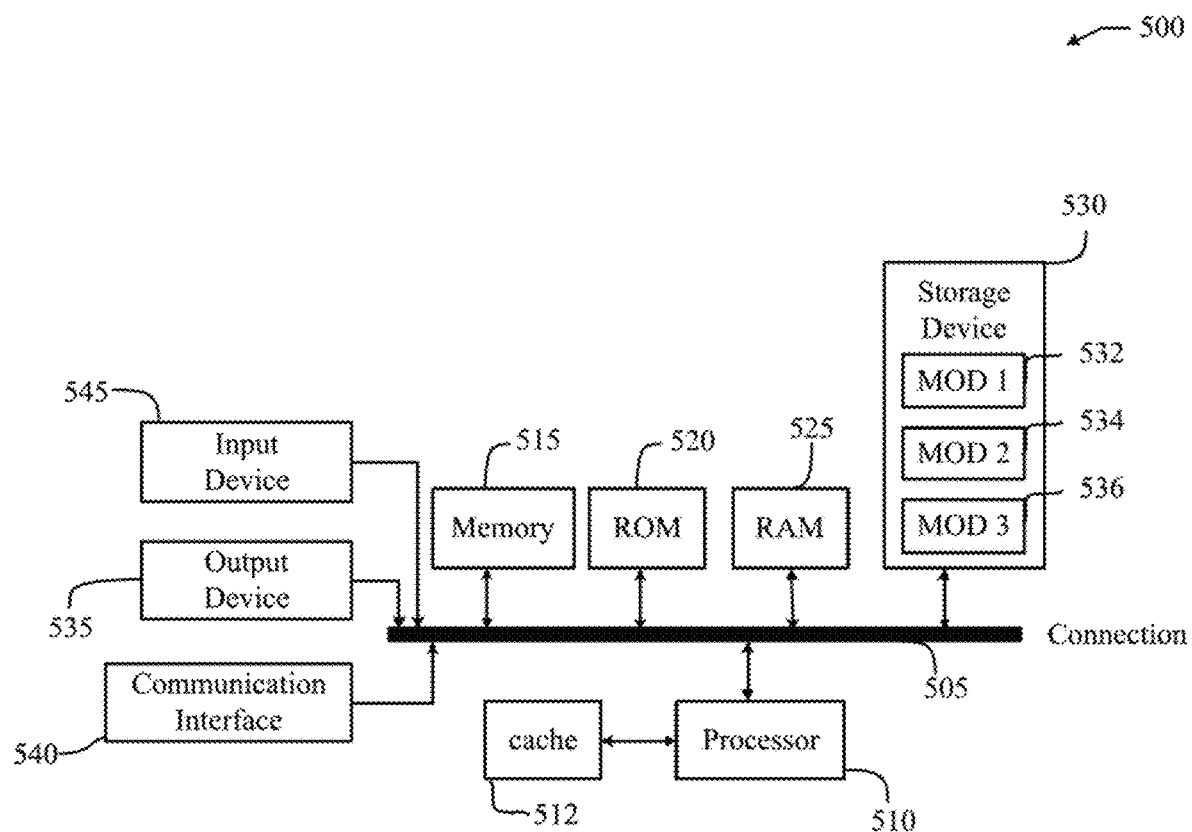
FIG. 5 illustrates an example computing device in accordance with various embodiments.

The disclosure now turns to FIGS. 4 and 5, which illustrate example network devices and computing devices, such as switches, routers, load balancers, client devices, and so forth.

FIG. 4 illustrates an example network device 400 suitable for implementing a network appliance of the subject technology. Network device 400 includes a central processing unit (CPU) 404, interfaces 402, and a bus 410 (e.g., a PCI bus). When acting under the control of appropriate software or firmware, the CPU 404 is responsible for executing packet management, error detection, and/or routing functions. CPU 404 accomplishes all these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). They can control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 406 could also hold various software containers and virtualized execution environments and data.

The network device 400 can also include an application-specific integrated circuit (ASIC), which can be configured to perform routing and/or switching operations. The ASIC can communicate with other components in the network device 400 via the bus 410, to exchange data and signals and coordinate various types of operations by the network device 400, such as routing, switching, and/or data storage operations, for example.

FIG. 5 illustrates a computing architecture 500 wherein the components of the system are in electrical communication with each other using a connection 505, such as a bus. Exemplary system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. Storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
 identifying one or more network parameters of a network;
 determining a first epoch for the network, the first epoch corresponding a first periodicity for analyzing the network based on the one or more network parameters;
 generating a profile for the network that includes an indication of the first epoch and the first periodicity for analyzing the network;
 analyzing the network using the profile;
 determining a second epoch for the network, the second epoch corresponding to a second periodicity for analyzing the network based on the profile, wherein the first periodicity and the second periodicity each reflect a corresponding time duration for completing the analyzing of the network;
 updating the profile to include the second epoch; and
 predicting a third epoch for a different network based on the first epoch and the second epoch, the different network having a threshold similarity with the network.

2. The method of claim 1, wherein the first periodicity for analyzing the network is determined before the network is monitored.

3. The method of claim 1, wherein the network is analyzed using the profile for an unbounded duration to determine the epoch for the network.

4. The method of claim 1, wherein the first epoch is of a greater duration than the second epoch for analyzing the network based on the profile.

5. The method of claim 1, wherein the one or more network parameters of the network are received from a network administrator associated with the network.

6. The method of claim 1, wherein the one or more network parameters of the network are detected based on a tenant associated with the network.

7. The method of claim 1, wherein the one or more network parameters include a number of devices in the network and device types of the devices in the network.

8. The method of claim 1, wherein the second epoch is identified based on characteristics of another network that shares a tenant with the network.

9. A system comprising:
one or more processors; and
a computer-readable medium comprising instructions stored therein, which when executed by the one or more processors, cause the one or more processors to:
identify one or more network parameters of a network;
determine a first epoch for the network, the first epoch corresponding to a first periodicity for analyzing the network based on the one or more network parameters;
generate a profile for the network that includes an indication of the first epoch and the first periodicity for analyzing the network;
analyze the network using the profile;
determine a second epoch for the network, the second epoch corresponding to a second periodicity for analyzing the network based on the profile, wherein the first periodicity and the second periodicity each reflect a corresponding time duration for completing the analyzing of the network;
update the profile to include the second epoch; and
predict a third epoch for a different network based on the first epoch and the second epoch, the different network having a threshold similarity with the network.

10. The system of claim 9, wherein the first periodicity for analyzing the network is determined before the network is monitored.

11. The system of claim 9, wherein the network is analyzed using the profile for an unbounded duration to determine the epoch for the network.

12. The system of claim 9, wherein the first epoch is of a greater duration than the second epoch for analyzing the network based on the profile.

13. The system of claim 9, wherein the one or more network parameters of the network are received from a network administrator associated with the network.

14. The system of claim 9, wherein the one or more network parameters of the network are detected based on a tenant associated with the network.

15. The system of claim 9, wherein the one or more network parameters include a number of devices in the network and device types of the devices in the network.

16. The system of claim 9, wherein the second epoch is identified based on characteristics of another network that shares a tenant with the network.

17. A non-transitory computer-readable storage medium comprising instructions stored therein, which when executed by one or more processors, cause the one or more processors to:
identify one or more network parameters of a network;
determine a first epoch for the network, the first epoch corresponding to a first periodicity for analyzing the network based on the one or more network parameters;
generate a profile for the network that includes an indication of the first epoch and the first periodicity for analyzing the network;
analyze the network using the profile;
determine a second epoch for the network, the second epoch corresponding to a second periodicity for analyzing the network based on the profile, wherein the first periodicity and the second periodicity each reflect a corresponding time duration for completing the analyzing of the network;
update the profile to include the second epoch; and
predict a third epoch for a different network based on the first epoch and the second epoch, the different network having a threshold similarity with the network.

\* \* \* \* \*